(12) United States Patent
Li et al.

(10) Patent No.: US 9,031,781 B2
(45) Date of Patent: May 12, 2015

(54) NAVIGATION SYSTEM WITH PRIORITY NOTIFICATION MECHANISM

(71) Applicant: Telenav, Inc., Sunnyvale, CA (US)

(72) Inventors: Weiying Li, Cupertino, CA (US); Aliasgar Mumtaz Husain, Milpitas, CA (US)

(73) Assignee: Telenav, Inc., Sunnyvale, CA (US)

( * ) Notice: Subject to any disclaimer, the term of this patent is extended or adjusted under 35 U.S.C. 154(b) by 0 days.

(21) Appl. No.: 13/890,870

(22) Filed: May 9, 2013

(65) Prior Publication Data

US 2014/0336919 A1 Nov. 13, 2014

(51) Int. Cl.
*G01C 21/26* (2006.01)
*G01C 21/36* (2006.01)

(52) U.S. Cl.
CPC ........ *G01C 21/3697* (2013.01); *G01C 21/3655* (2013.01)

(58) Field of Classification Search
CPC .......... G01C 21/00; G01C 21/26; G01S 5/14; H04W 24/00; G06F 17/00
USPC ......... 701/400–419, 423, 425, 426, 428–432, 701/437–439, 460, 468, 532; 342/357.22, 342/357.31, 357.75; 340/988, 990, 340/995.1–996, 426.23, 435, 438, 463; 709/207
See application file for complete search history.

(56) References Cited

U.S. PATENT DOCUMENTS

| | | | | |
|---|---|---|---|---|
| 5,627,549 A * | 5/1997 | Park | | 701/300 |
| 5,664,948 A * | 9/1997 | Dimitriadis et al. | | 434/307 R |
| 5,682,525 A * | 10/1997 | Bouve et al. | | 1/1 |
| 6,381,534 B2 * | 4/2002 | Takayama et al. | | 701/465 |
| 6,429,812 B1 * | 8/2002 | Hoffberg | | 342/357.31 |
| 6,845,321 B1 * | 1/2005 | Kerns | | 701/426 |
| 7,345,628 B2 * | 3/2008 | Soundararajan | | 342/357.31 |
| 7,376,414 B2 * | 5/2008 | Engstrom | | 455/414.3 |
| 7,668,654 B2 * | 2/2010 | Pemble et al. | | 701/468 |
| 7,751,804 B2 * | 7/2010 | Steelberg et al. | | 455/414.2 |
| 7,835,859 B2 * | 11/2010 | Bill | | 701/424 |
| 7,925,429 B2 * | 4/2011 | Geelen | | 701/455 |
| 8,027,784 B2 | 9/2011 | Geelen | | |
| 8,233,919 B2 * | 7/2012 | Haag et al. | | 455/456.3 |
| 8,290,351 B2 * | 10/2012 | Plotnick et al. | | 386/344 |
| 8,682,726 B2 * | 3/2014 | Hoffberg | | 705/14.63 |
| 2001/0020211 A1 * | 9/2001 | Takayama et al. | | 701/200 |
| 2002/0091568 A1 * | 7/2002 | Kraft et al. | | 705/14 |
| 2002/0119752 A1 * | 8/2002 | Bates et al. | | 455/45 |
| 2002/0184091 A1 * | 12/2002 | Pudar | | 705/14 |
| 2006/0095204 A1 * | 5/2006 | Kim | | 701/211 |
| 2006/0116819 A1 * | 6/2006 | Soundararajan | | 701/213 |
| 2008/0024364 A1 | 1/2008 | Taylor | | |
| 2010/0063726 A1 * | 3/2010 | Marjenberg et al. | | 701/207 |
| 2010/0312470 A1 * | 12/2010 | Chen et al. | | 701/208 |
| 2012/0136955 A1 | 5/2012 | Hill | | |

FOREIGN PATENT DOCUMENTS

WO 2008016395 9/2008

* cited by examiner

*Primary Examiner* — Thomas Tarcza
*Assistant Examiner* — Tyler J Lee
(74) *Attorney, Agent, or Firm* — IP Investment Law Group

(57) ABSTRACT

A method of operation of a navigation system includes: generating a system message along a route determining a priority value for the system message; sorting the system message based on the priority value and a message play time for the system message; calculating an available play time for the system message; and selecting the system message having the message play time not exceeding the available play time.

20 Claims, 5 Drawing Sheets

NAVIGATION SYSTEM WITH PRIORITY NOTIFICATION MECHANISM

TECHNICAL FIELD

The present invention relates generally to a navigation system, and more particularly to a system with notification.

BACKGROUND

Modern portable consumer and industrial electronics, especially client devices such as navigation systems, cellular phones, portable digital assistants, and combination devices, are providing increasing levels of functionality to support modern life including location-based information services. Numerous technologies have been developed to utilize this new functionality. Some of the research and development strategies focus on new technologies while others focus on improving the existing and mature technologies. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, hazard condition warnings, advertising, or other points of interest (POI). The real-time information provides valuable relevant information. However, not all notifications are the same.

Thus, a need remains for a navigation system with priority notification mechanism to better assist the user with more appropriate notification. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: generating a system message along a route determining a priority value for the system message; sorting the system message based on the priority value and a message play time for the system message; calculating an available play time for the system message; and selecting the system message having the message play time not exceeding the available play time.

The present invention provides a navigation system, including: a message generation module for generating a system message along a route, determining a priority value for the system message; a message organizer module, coupled to the message generation module, for sorting the system message based on the priority value and a message play time for the system message, and selecting the system message having the message play time not exceeding the available play time.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
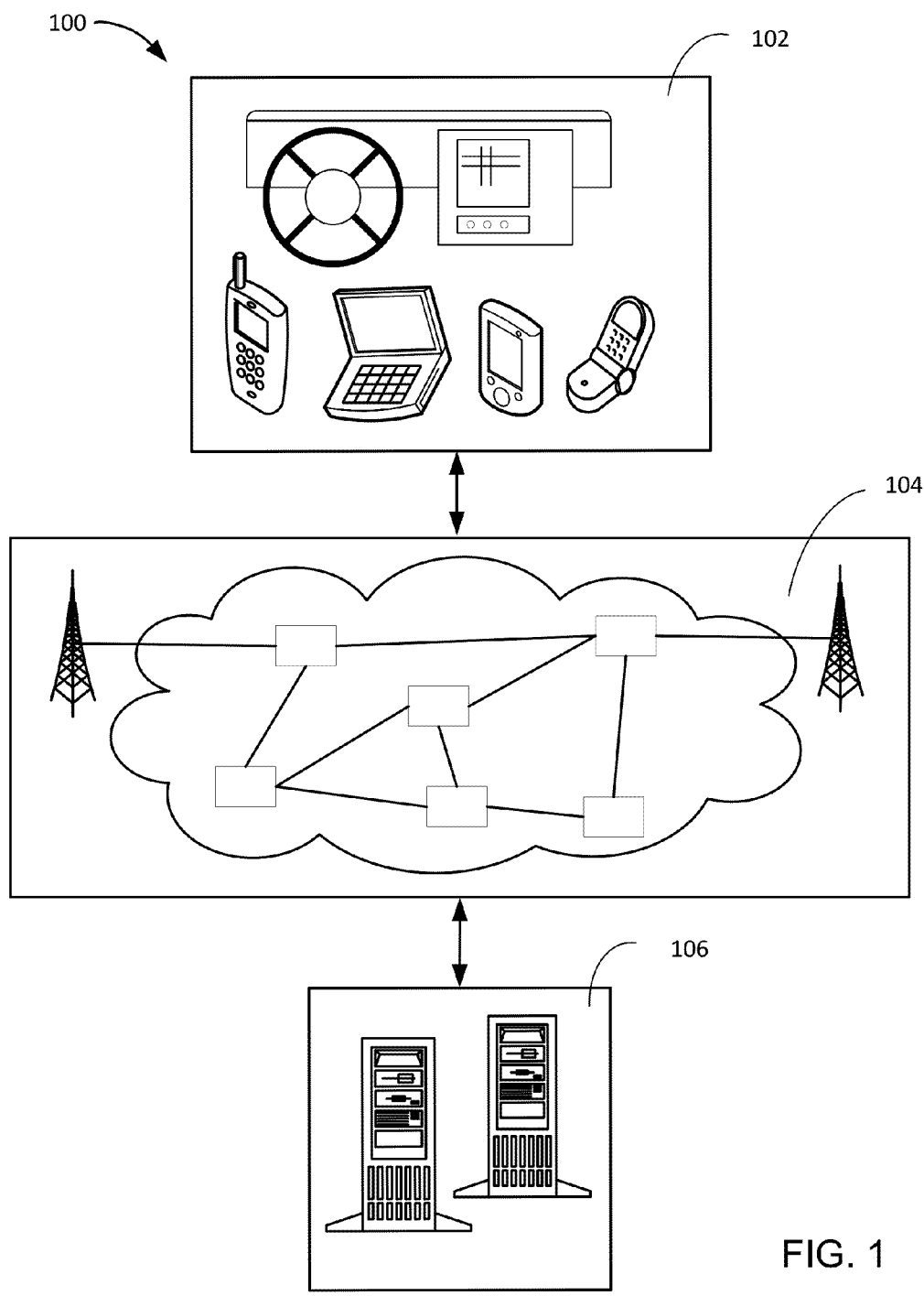
FIG. 1 is a navigation system with priority notification mechanism in an embodiment of the present invention.

The following embodiments are described in sufficient details to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments and elements have been numbered as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element comprising a speed component and a heading component.

The term "navigation routing information" referred to herein includes the navigation routing information described as well as information relating to points of interest to the user, such as local business, hours of businesses, types of businesses, advertised specials, traffic information, maps, local events, and nearby community or personal information.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown is a navigation system 100 with priority notification mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematics navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
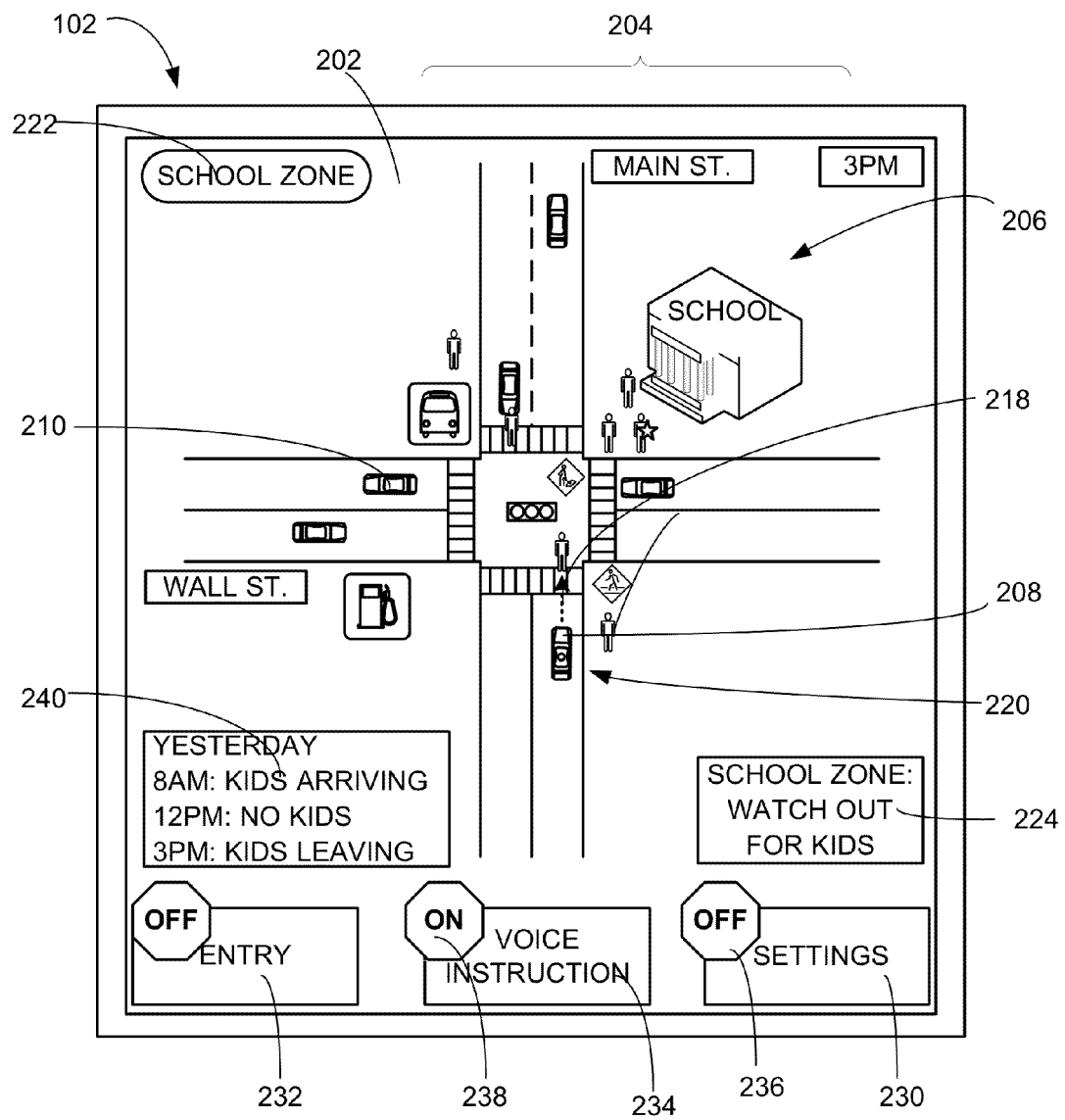
FIG. 2 is an example of a display interface of the first device.

Referring now to FIG. 2, therein is shown an example of a display on a display interface 202 of the first device 102. Surrounding information 204 is defined as environmental information that surrounds a user's vehicle 208 while the user is operating the vehicle. The user's vehicle 208 is defined as the vehicle operated by the user. The user's vehicle 208 is depicted traveling along a route 218.

As an example, the surrounding information 204 can include the temperature outside the vehicle, the bumpiness of the road, or the combination thereof. The surrounding information 204 can include radio broadcasting, WiFi signal emitted by the school, or the combination thereof.

The driving environment 206 is defined as a totality of conditions that surrounds the user's vehicle 208 while the user is operating the vehicle. For example, the aggregation of the surrounding information 204 can represent the totality of conditions that surrounds the user's vehicle 208.

As a specific example, the surrounding information 204 can be students leaving school at 3 PM. The surrounding information 204 can include vehicles parked on the curbside by the parents waiting to pick up the students. The surrounding information 204 can include a pedestrian road sign representing students crossing the street. The aggregation of the surrounding information 204 can represent that the driving environment 206 is a school zone.

As a different example, the surrounding information 204 can be black ice on the road. The surrounding information 204 can be minus 15 degrees Celsius for the temperature outside the user's vehicle 208. The surrounding information 204 can be a road that is downhill. The surrounding information 204 can be an altitude of 7000 feet. The aggregation of the surrounding information 204 can represent the driving environment 206 where the user's vehicle 208 is traveling is a mountainous region in the winter.

As another example, the driving environment 206 representing a school zone can be a range of 100 meter to 1 kilometer in diameter centering from the geographic location of the elementary school. The driving environment 206 can include a moving object 210. The moving object 210 is defined as a non-stationary object while proximate to the user's vehicle 208. As examples, the moving object 210 can include a human being, other vehicles on the road, or the combination thereof. The moving object 210 can be animate or inanimate objects.

A current location 220 is defined as the present geographic location of the user or the present geographic location for the user's vehicle 208. An environment category 222 is defined as grouping of the driving environment 206 based on different characteristics of the driving environment 206.

For example, the environment category 222 can be divide the driving environment 206 into groups of safe, hazardous, or the combination thereof. As a more specific example, if the environment category 222 for the driving environment 206 is hazardous, the user can require an extra attention 228 while operating the vehicle in the driving environment 206. The driving environment 206 being hazardous can include a construction zone with pot holes on the road.

The display interface 202 can provide a system message 224 for the user. The system message 224 is defined as a visual notification, an audio notification, tactile notification, or a combination thereof to notify the user. For example, the driving environment 206 being hazardous can represent the driving environment 206 being potentially dangerous or is dangerous. As a more specific example, the driving environment 206 being hazardous can include the driving environment 206 having a construction site in the middle of the intersection, a black ice on the road, or the combination thereof. The system message 224 can also be used for providing guidance instruction. The system message 224 can be used to provide advertisement notification.

The display interface 202 can display a functionality 230 of the navigation system 100. For example, the functionality 230 can represent the function of the navigation system 100 that a user can manipulate to command the navigation system 100. The functionality 230 can include an entry 232 for the user to manually enter the address into the navigation system 100. The functionality 230 can represent a voice instruction 234 for the user to give oral commands to the navigation system 100.

A display appearance 236 is defined as how the display interface 202 appears to the user while the user is operating the vehicle. For example, the display appearance 236 can change by recognizing the hazardousness the driving environment 206. As a more specific example, if the user is operating the vehicle where the driving environment 206 is hazardous, the display appearance 236 can turn red for alerting the user of the hazardousness of the driving environment 206. When the driving environment 206 is not hazardous, the display appearance 236 can be green.

Continuing with the example, the display appearance 236 can be different by changing the font size for the texts that appear on the display interface 202. As a specific example, the texts that appear on the display interface 202 can increase in font size when the driving environment 206 is hazardous to increase the readability of the texts.

As another example, the display appearance 236 can change by removing a selectability 238 of the functionality 230 if the user is operating the vehicle in the driving environment 206 that is hazardous. The selectability 238 is defined as the availability of the functionality 230 while the user is operating the vehicle within the driving environment 206. The availability of the functionality 230 can include a display control appearing or disappearing by recognizing the hazardousness of the driving environment 206.

For a more specific example, the selectability 238 of the functionality 230 for the entry 232 can be "OFF" when the user is operating the vehicle in the driving environment 206 that is hazardous to reduce the user's distraction level from manually entering an address. The display appearance 236 can change from "ON" to "OFF."

As a different example, the selectability 238 of the functionality 230 for the voice instruction 234 can be "ON" to allow the user to give oral commands instead of manual entry to the navigation system 100 when the user is operating the vehicle within the driving environment 206 that is hazardous. The display appearance 236 can change from "OFF" to "ON."

For a further example, the display appearance 236 can change by reducing the amount of information displayed on the display interface 202. More specifically, currently in FIG. 2, the display interface 202 shows multiple vehicles other than the user's vehicle 208. The display interface 202 is also showing people walking around the intersection. When the user is operating the vehicle in the driving environment 206 that is hazardous, the display appearance 236 can change by reducing the amount of information displayed on the display interface 202 by removing the information for the multiple vehicles and people from the display interface 202.

Past information 240 are defined as the surrounding information 204 previously collected by the navigation system 100. The past information 240 is also defined as the driving environment 206 previously recognized by the navigation system 100. For example, the past information 240 can represent the time students arrive at school, the time student left school, or the combination thereof. As another example, the past information 240 can represent that the intersection at Main Street and Wall Street was recognized by the navigation system 100 to be a school zone.

Figure 3:
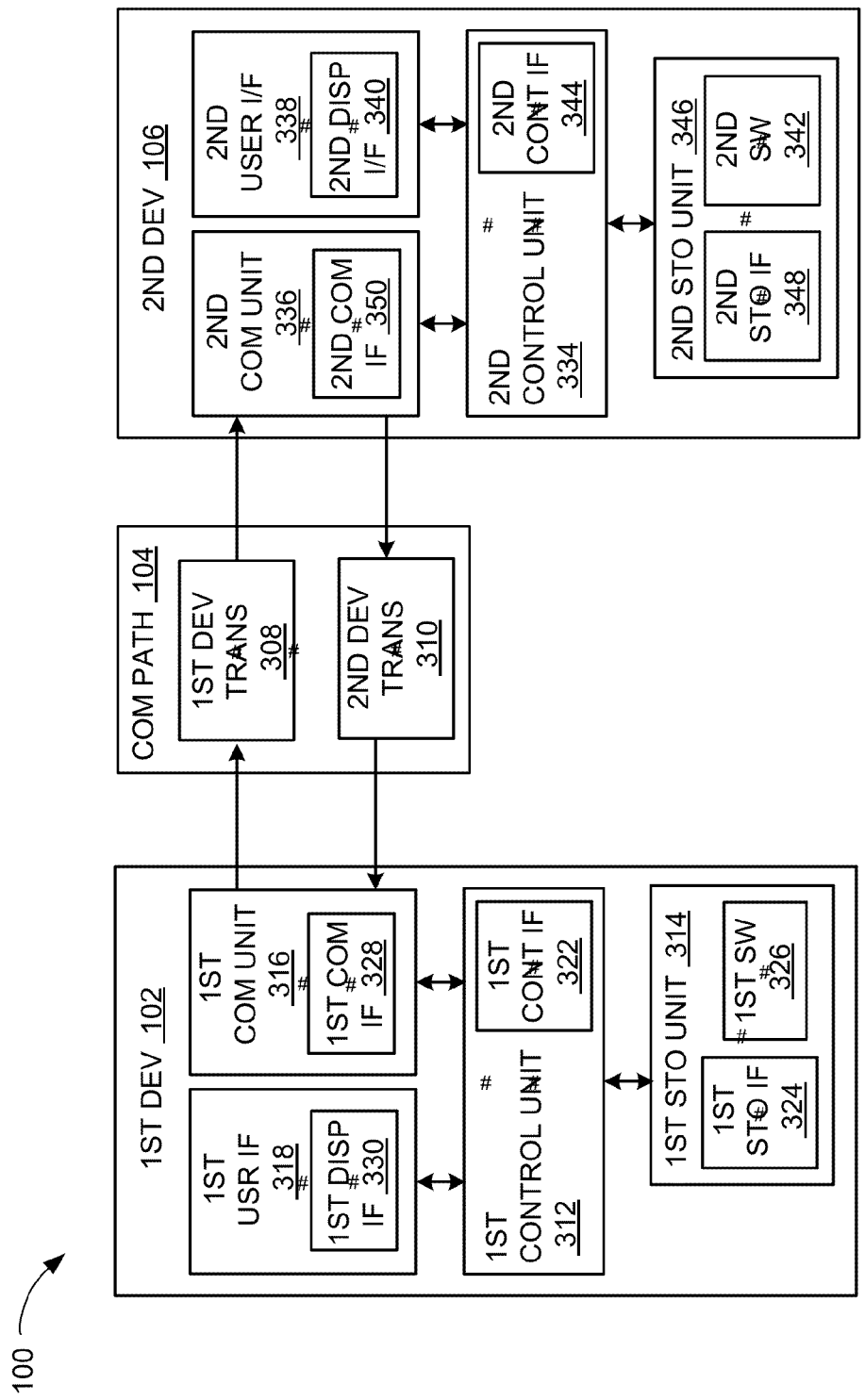
FIG. 3 is an exemplary block diagram of the navigation system.

Referring now to FIG. 3, therein is shown an exemplary block diagram of the navigation system 100. The navigation system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server having a display interface.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, and a first user interface 318. The first control unit 312 can include a first control interface 322. The first control unit 312 can execute a first software 326 to provide the intelligence of the navigation system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a micro-electromechanical system (MEMS), optical circuitry, waveguides, wireless circuitry, wire line circuitry, or a combination thereof.

The first storage unit 314 can store the first software 326. The first storage unit 314 can also store the relevant information, such as data representing incoming images, data representing previously presented image, sound files, or a combination thereof.

The first storage unit 314 can be a volatile memory, a nonvolatile memory, an internal memory, an external memory, or a combination thereof. For example, the first storage unit 314 can be a nonvolatile storage such as nonvolatile random access memory (NVRAM), Flash memory, disk storage, or a volatile storage such as static random access memory (SRAM).

The first storage unit 314 can include a first storage interface 324. The first storage interface 324 can be used for communication between and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the navigation system 100. The first control unit 312 can also execute the first software 326 for the other functions of the navigation system 100. The first control unit 312 can further execute the first software 326 for interaction with the communication path 104 via the first communication unit 316.

The second device 106 can be optimized for implementing an embodiment of the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wire line circuitry, or a combination thereof.

A second storage unit 346 can store the second software 342. The second storage unit 346 can also store the such as data representing incoming images, data representing previously presented image, sound files, or a combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as nonvolatile random access memory (NVRAM), Flash memory, disk storage, or a volatile storage such as static random access memory (SRAM).

The second storage unit 346 can include a second storage interface 348. The second storage interface 348 can be used for communication between other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100.

Figure 4:
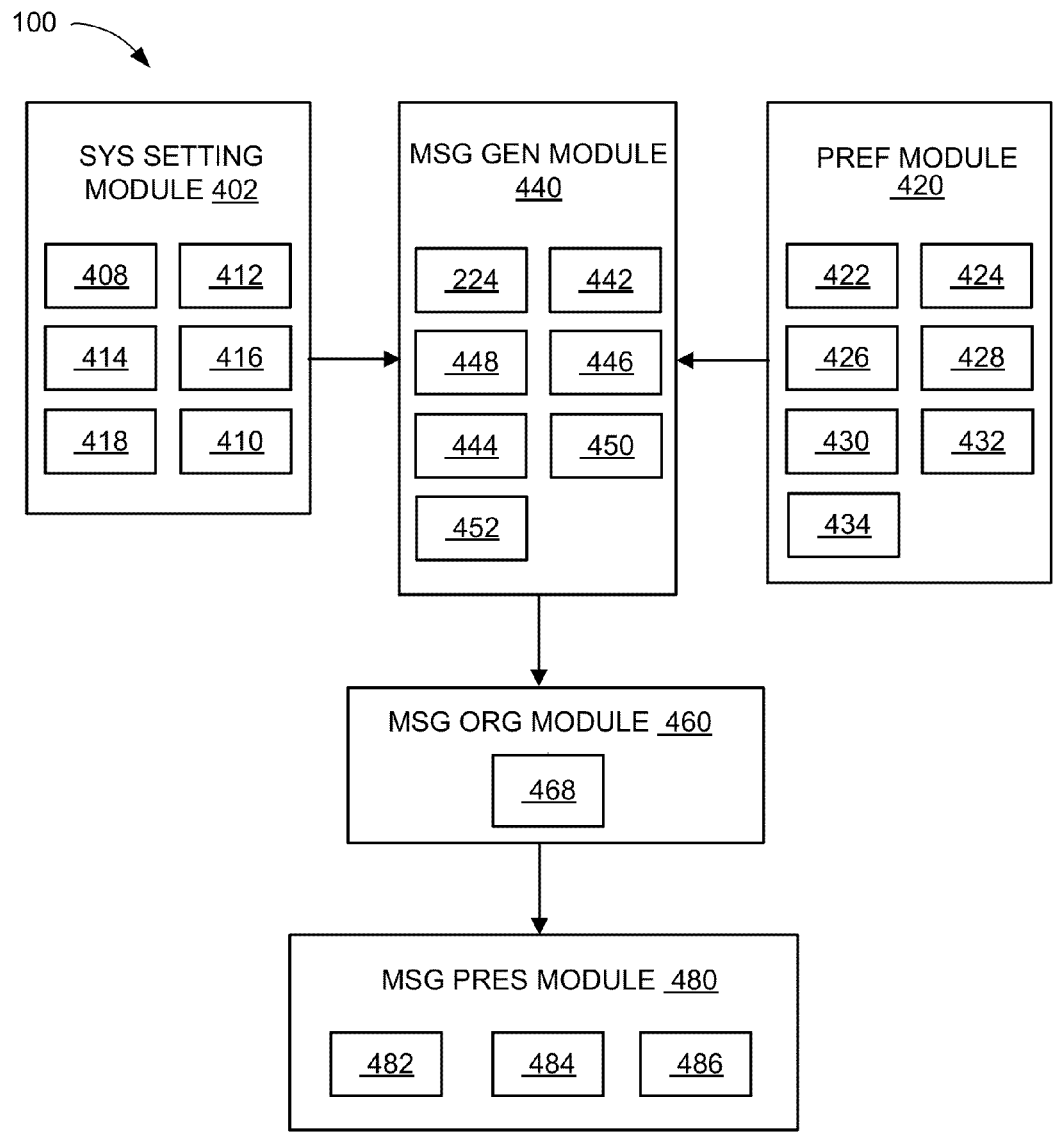
FIG. 4 is a control flow of the navigation system.

Referring now to FIG. 4, therein is shown a control flow of the navigation system 100. The navigation system 100 can include a system setting module 402, a preference module 420, a message generation module 440, a message organizer module 460, and a message presentation module 480.

The system setting module 402 provides system settings that instruct the navigation system 100 to generate the system message 224. The system settings can include a message type setting 408, which provides the types of the messages the navigation system 100 can generate. The navigation system 100 can update the system settings based on change of the functionality 230 of FIG. 2 or based on the selectability 238 of FIG. 2. The user of the navigation system 100 cannot change the system settings.

The message type setting 408 can include the types of messages the navigation system 100 can generate. For example, the message type setting 408 can be a navigation message 412, an environmental message 414, a reminder message 418, a point of interest message 416, or a commercial message 410. The navigation system 100 can generate the system message 224 according to the message type setting 408. For example, when the message type setting 408 involves environmental information, the navigation system 100 can generate the environmental message 414. When the message type setting 408 does not involve the reminder message 418, the navigation system 100 cannot generate the reminder message 418.

The navigation message 412 is within a category of messages relating to the navigation and route guidance functions of the navigation system 100. The navigation message 412 can include route information, guidance instructions along a route, rerouting messages, or other messages relating to guide a user of the navigation system 100 from a start location to a destination or waypoint. For example, the navigation message 412 can include a message "right turn at Main Street in 0.5 mile", or "take the freeway exit 212 in 1 mile".

The environmental message 414 is within a category of messages relating to environment for the surrounding information 204 of FIG. 2, the environment category 222 of FIG. 2, the driving environment 206, or a combination thereof. Examples of the environmental message 414 can include a weather forecasting message, a traffic condition message, a speed limit, a zoning information (school zone or head light request zone), or a road condition (flooding or icing). For example, the environmental message 414 can be "school zone with a speed 25 mph", or "traffic congestion on south bound highway 101".

The reminder message 418 can provide informational messages to assist the user of the navigation system 100. For example, the reminder message 418 can be a customized reminder to buy groceries, or pick up dry clean on the way home. The reminder message 418 can be system generated reminder "day light saving time starts midnight of March 30th".

The point of interest message 416 can provide helpful information regarding facilities and businesses around the current location 220 of FIG. 2 or along the route 218 of FIG. 2. Example of the point of interest message 416 can include location information and phone numbers for hotels, restaurants, gas stations, parks, public services, or hospitals along the traveling route of user of the navigation system 100. The point of interest message 416 does not contain commercial information or is not paid by business entities referred to in the point of interest message 416. As an example, the point of interest message 416 can provide location information, phone numbers, business hours, or a combination thereof for the nearest gas station, but cannot include any paid information promoting lower gas price or higher gas quality.

An example for the point of interest message 416 can be "Shell gas station at freeway exit 210". Another example for the point of interest message 416 can be "McDonald restaurant in 0.5 mile", without advertising McDonald's new menu "McBite" or price promotion "$1 coffee any size".

A commercial message 410 is a message paid by a business or entity to promote services or products. For example, the commercial message 410 can provide a discount message of a department store, or an announcements of a newly opened golf course off a freeway exit along the route that user travels.

The commercial message 410 can be a general broadcasting message which is unrelated to the current location 220. For example, the commercial message 410 can be Subway advertisement when there is no Subway restaurant around the current location 220 or along the route 218 of FIG. 2 that user travels. The commercial message 410 can be Airline's advertisement promoting lower air fare or cruise line's announcement of the new cruise ship.

The navigation system 100 can generate the commercial message 410 based on the price paid by business. As an example, the navigation system 100 can generate message of Subway more frequently than message of Burger King when Subway pays higher price than Burger King. The price for the commercial message 410 can be different based on different providers or can be based the word count of the messages to be played. For example, a detailed message costs more than a brief message based on the word count.

The navigation system 100 can generate the commercial messages 410 base on locations, seasons, or occasions. For example, in September, the navigation system 100 can present Starbucks message in Alaska and Cold-Stone message in Florida. At same location, the navigation system 100 can present Christmas tree farm advertisement in December and water park advertisement in July. Before the 4th of July holiday, the firework stand advertisement can be generated by the navigation system 100.

The navigation system 100 can include a preference module 420. The preference module 420 provides preferences for a particular user of the navigation system 100, for the context of the usage of the navigation system 100, for the capability of the navigation system 100, for a given set of conditions, or a combination thereof. The preferences can include a message format preference 422, or a presentation speed preference 430. The preferences provide further instructions for the navigation system 100 to generate the system message 224 that suit the user requirements in additional to the system settings.

The user of the navigation system 100 has an option to set the preferences or not to set. When the preferences are not set, the navigation system 100 can choose the appropriate format based on the message format preference 422 and the presentation speed preference 430 for the system message 224 to best suit the conditions and restrictions.

The preference module 420 can set the message format preference 422. The message format preference 422 indicates the length and content of the system message 224 to be presented. The message format preference 422 can set a message content 444 for the system message 224 to be a detailed content 428, an intermediate content 426 or a brief content 424. For example, the system message 224 can be presented with the brief content 424, the intermediate content 426, or the detailed content 428.

The detailed content 428 includes a more descriptive message for the system message 224. The detailed content 428 typically has a longer playing time compared to the other forms of the message content 444. The brief content 424 includes the least message or information for the message content 444. The brief content 424 typically has a shortest play time compared to the other forms of the message content 444. The intermediate content 426 includes a descriptive message or the amount of information between the brief content 424 and the detailed content 428. The intermediate content 426 typically has an intermediate play time compared to the brief content 424 and the detailed content 428.

Not all the types in the message type setting 408 can have the various forms of the message content 444. For example, the navigation message 412 can be represented with the brief content 424, exclusively. Also for example, the environmental message 414 can have the detailed content 428 "school zone at 25 mph in 1 mile", the intermediate content 426 "school zone in 1 mile", or the brief content 424 "school zone ahead". As a further example, the point of interest message 416 can have the detailed content 428 of "Shell gas station at freeway exit 210 in 0.5 mile opens 5 am-11 pm", the intermediate content 426 of "Shell gas station at freeway exit 210 in 0.5 mile", or the brief content 424 of "Gas station in 0.5 mile".

The preference module 420 can include the presentation speed preference 430. The presentation speed preference 430 can set audio message to be played at a normal speed 432 or a fast speed 434. However, the system message 224 having only the brief content 424 as the message content 444 can be played at the normal speed 432, exclusively. For example, the navigation message 412 can be played only in the normal speed 432 because the navigation message 412 only has the brief content 424. Another example, the point of interest message 416 can be played at the fast speed 434 or the normal speed 432 when the message content 444 is the intermediate content 426 or the detailed content 428, but only at the normal speed 432 when the message content 444 is the brief content 424.

The navigation system 100 can include the message generation module 440. The message generation module 440 generate the system message 224 based on the system settings in the system setting module 402 and the preferences in the preference module 420. The system message 224 that meet the system settings, or the preferences, or a combination thereof, can be assigned with a priority value 442, a message identification 448, the message content 444, and a message play time 446. The system message 224 then can be prioritized, sorted, organized in the message organizer module 460, and converted to the system message 224 to be played out by the navigation system 100 with the message presentation module 480. The system message 224 can be sorted based on the priority value 442, the message play time 446, or a combination thereof.

The message generation module 440 can generate the system message 224 based on the message type setting 408. The message generation module 440 cannot generate the messages whose message types are not defined in the message type setting 408. For example, the navigation system 100 will not generate a reminder message 418 when the message type setting 408 does not include the reminder message 418. When a message type is included in the message type setting 408, the navigation system 100 can generate the system message 224 of that message type. When a message type is not included in the message type setting 408, the navigation system 100 will not generate that type of messages.

For example, when the commercial message 410 is included in the message type setting 408, the message generation module 440 will generate the commercial message 410. When the reminder message 418 is not included in the message type setting 408, the message generation module 440 will not generate the reminder message 418. The message generation module 440 can assign the message identification 448 for the system message 224 when the system message 224 is generated.

The message identification 448 is a unique number corresponding to the type of the system message 224. For example, the message type setting 408 can include the environmental message 414 corresponding to the message identification 448 of "1010" and the navigation message 412 corresponding to the message identification 448 of "1001".

When the message generation module 440 generates the environmental message 414, the message generation module 440 can assign "1010" as the message identification 448 to the system message 224. Another example, the message generation module 440 can generate the navigation message 412 when the message type setting 408 includes the navigation message 412, and can assign "1001" as the message identification 448 to the system message 224.

After the message generation module 440 generates the system message 224 with the message identification 448, the message generation module 440 can prioritize the system message 224 by assigning an initial number to the priority value 442. The priority value 442 of the system message 224 is a number assigned to the system message 224 to index the priority of the message based on the conditions and restrictions when the system message 224 is generated. The lower number for the priority value 442 means a higher priority.

The message generation module 440 can determine initial number for the priority value 442 according to conditions and restrictions at the time when the system message 224 is generated. Examples of these conditions and restrictions include an importance of message, a message type, a price paid by message provider, the current location 220, the message play time 446, or a combination of thereof.

As an example, the message generation module 440 can determine that the navigation message 412 has a higher priority than the point of interest message 416 based on the importance of the message. The message generation module 440 can decide that the navigation message 412 is more important than the point of interest message 416. The priority value 442 of the navigation message 412 is lower than the priority value 442 of the point of interest message 416 according to the message type.

Besides the importance of the message, the message generation module 440 can take in consideration of the current location 220 of the user to decide the priority of the messages. For example, when the current location 220 is closer to the location A, which corresponds to the point of interest message 416, than the turn point B, which corresponds to the navigation message 412, the message generation module 440 can assign a lower number for the priority value 442 to the point of interest message 416 representing a higher priority than the navigation message 412.

Another example, the message generation module 440 can generate two messages that are the point of interest message 416, a first message 417 whose corresponding point A is closer to the current location 220, and a second message 419 whose corresponding point B is farther from the current location 220. The message generation module 440 can assign a lower number for the priority value 442 representing a higher priority to the first message 417, a higher value to the priority value 442 representing a lower priority to the second message 419 to representing a lower priority.

The message generation module 440 can consider the price that a provider pays for the commercial message 410. The higher the price paid by the provider, the commercial message 410 will have a higher priority. For example, the commercial message 410 whose provider A pays a higher price can have a high priority than the commercial message 410 whose provider B pays a lower price. The price of the commercial message 410 can be a lump sum, or based on the word count per message, or based on the frequency of the message played, or a combination of those. For example, Subway's advertisement has a higher word count than Burger King's advertisement. When the commercial message 410 is charged by word count, the Subway's advertisement is charged more than Burger King's advertisement resulting in the Subway's advertisement having a higher priority than Burger King's advertisement.

Another example, when there is a time restriction, the message play time 446 is within an available play time 450 will have a higher priority. The available play time 450 is the time limit that the navigation system 100 can have to play a certain message. The message generation module 440 can calculate the available play time 450 for the system message 224 based on the current location 220, user travel speed, and the point where the message is associated with.

For example, the environmental message 414 is a "school zone" warning referring to school A with a first play time 447 for the message play time 446. The reminder message 418 is a "gas station" message referring to gas station B with the message play time 446 being a second play time 449. The school A is closer to the current location 220 than gas station B. Since the environmental message 414 is more important than the reminder message 418, and the current location 220 is closer to school A than gas station B, the environmental message 414 has a higher priority than the reminder message 418.

However, the available play time 450 is shorter than the first play time 447 of the environmental message 414, but longer than the second play time 449 of the reminder message 418. By considering the combination of conditions and restrictions, such as message type, the current location 220, or time restriction, the message generation module 440 can determine that the reminder message 418 has a higher priority than the environmental message 414.

The message generation module 440 can choose the form for the message content 444 and the message play time 446 for the system message 224 based on the message identification 448 and the priority value 442. The system message 224 can be represented with different forms of the message content 444. The form of the message content 444 can be the brief content 424, the intermediate content 426, or the detailed content 428.

Different message content contains different amount of information of the system message 224. Each form of the message content 444 can impact the message play time 446. When the message format preference 422 is set, the message generation module 440 can select the form for the message content 444 based on the message format preference 422.

The message generation module 440 can select the detailed content 428 when the message format preference 422 is for a detailed message, the brief content 424 when the message format preference 422 is for a brief message, or the intermediate content 426 when the message format preference 422 is for an intermediate message. When the message format preference 422 is not selected or specified, the message generation module 440 can select one the form of the message content 444 based on other conditions and restrictions, such as, the current location 220, price paid by provider, or the available play time 450.

When the message play time 446 for the detailed content 428 is within the available play time 450, the message generation module 440 can select the detailed content 428. When the message play time 446 for the detailed content 428 exceeds the available play time 450, the message generation module 440 can evaluate the message play time 446 of intermediate content 426 or the brief content 424. The message generation module 440 can select the message content 444 where the message play time 446 is within the available play time 450.

When the commercial message 410 is charged by the word count of the message content 444, the message generation module 440 can select to play the detailed content 428, which has more word count, as long as the message play time 446 is within the restriction of the available play time 450. For example, the reminder message 418 has the detailed content 428, which the message play time 446 is longer than the available play time 450 because the message generation module 440 did not specify the message format preference 422, the message generation module 440 can select the intermediate content 426 to play when the message play time 446 of the intermediate content 426 is within the available play time 450.

The message generation module 440 can select a message presentation speed 452 according to the presentation speed preference 430. When the presentation speed preference 430 is not set, the message generation module 440 can select the message presentation speed 452 based on the available play time 450 and other conditions and restrictions.

For example, when the message play time 446 of the commercial message 410 with the detailed content 428 at the normal speed 432 is greater than the available play time 450, the message generation module 440 can select to play at the fast speed 434, as long as the message play time 446 for the commercial message 410, in this example, at fast speed 434 is within the available play time 450. However, the messages with the brief content 424 can be played at normal speed 432, exclusively.

When the message format preference 422, the presentation speed preference 430, or a combination thereof are not set, the message generation module 440 can select the appropriate form for the message content 444, the message presentation speed 452, or a combination thereof, to maximize the amount of information can be played. For example, when the message play time 446 of a message with the intermediate content 426 at the normal speed 432 exceeds the available play time 450, the message generation module 440 can select to play the brief content 424 at the normal speed 432 or the intermediate content 426 at the fast speed 434, as long as the message play time 446 is within the available play time 450.

Another example, when there is not sufficient time to play two messages that are the point of interest message 416 before user passes both points of interest, the message generation module 440 can select the brief forms for the message content 444 and the normal speed 432, or the intermediate content 426 at the fast speed 434 to shorten the message play time 446 for each of the messages. Generally speaking, the message generation module 440 can select different types of the message content 444 even for the same type of message so there can be sufficient time to play multiple messages with the available play time 450. In this example, there is sufficient time to play both message for the point of interest message 416. The message generation module 440 is intelligent to select the message content 444 or the message presentation speed 452 to make the best use of the time within the time restrictions and other conditions.

The message generation module 440 generates the system message 224 is with the message identification 448, the priority value 442, the message content 444, and the message play time 446. The message organizer module 460 organizes the system message 224 to be presented or played out as the user's vehicle 208 of FIG. 2 is traveling along the route 218 of FIG. 2.

The message organizer module 460 prioritizes, organizes, or manages the system message 224 stored in a message queue 468 according to the priority value 442. The message queue 468 is a message storage where the system message 224 to be inserted based on the priority value 442 of the system message 224.

The message organizer module 460 can index the system message 224 based on the priority value 442 and insert into the message queue 468 based on the indexing. The message organizer module 460 dispatches the system message 224 for presentation starting at the front or at the head of the message queue 468. The message organizer module 460 can organize or manage the message queue 468, remove messages that have been played or have no opportunity to be played. The message organizer module 460 can adjust the priority value 442 for the system message 224 and the position in the message queue 468 due to the changes of current conditions and restrictions.

The message queue 468 is a message storage entity where the system message 224 are prioritized and inserted to be dispatched for presentation or played out. The system message 224 are inserted into the message queue 468 indexed by the priority value 442 for that particular message. The system message 224 with a lower number for the priority value 442, representing a higher priority, occupies the front or the head of the message queue 468.

For example, when there is no other messages in the message queue 468, the priority value 442 of the commercial message 410 is assigned as "000" or the highest priority. The commercial message 410 is inserted to the front of the message queue 468. When there is another message as the environmental message 414, the message organizer module 460 evaluates the priority value 442 for each and between these two messages.

Based on the message type, the current location 220, the message play time 446, the available messages to play, and other conditions and restrictions, the message organizer module 460 can determine that the environmental message 414 has a higher priority than the commercial message 410. The message organizer module 460 can assign the priority value of "000" for the environmental message 414 and can adjust the priority value 442 for the commercial message 410 to "001".

The environmental message 414 can be inserted to the front of the message queue 468, while the commercial message 410 will be adjusted to the back of the message queue 468 or at least after the environmental message 414. The environmental message 414 is ready is dispatched from message queue 468 to be played out. If the environmental message 414 is played, the commercial message 410 can be moved to the front of the message queue 468 with the priority value 442 adjusted to "000", in this example.

When the message queue 468 has more than two or more messages, the message organizer module 460 can evaluate each instance of the system message 224 with the conditions and restrictions, assign or adjust the priority value 442 for each of the system message 224, and insert the messages to an appropriate position in the message queue 468. The message organizer module 460 dispatches the message from the front of the message queue 468 to the message presentation module 480, which will be described later.

Continuing with the example above, the commercial message 410 occupies the front of the message queue 468 after the dispatching of the environmental message 414. Before the commercial message 410 has a chance to be played out, the message generation module 440 can generate another message and another instance of the commercial message 410. The provider A of the commercial message 410, the new one, pays a higher price than the provider B of the commercial message 410, already in the message queue 468. The message organizer module 460 can evaluate the priority value 442 of each and determine that the newer instance of the commercial message 410 has a higher priority should be played out first.

The newer instance of the commercial message 410 can be assigned a priority value "000" and the priority value 442 for the older instance of the commercial message 410 can be adjusted to "001".

The positions of both the newer instance and the older instance of the commercial message 410 in the message queue 468 will be adjusted according to the respective values of the priority value 442. The newer instance of the commercial message 410 will be dispatched from the message queue 468 before the older instance. Afterwards, the priority value 442 for the older instance of the commercial message 410 can be adjusted to "000" and moved to the front of the message queue 468.

Continuing with the above example, the older version of the commercial message 410 is at the front of the message queue 468 ready to be played out. However, if the available play time 450 is less than the message play time 446 for the commercial message 410, then the commercial message 410 will not be played.

The message organizer module 460 can search the message play time 446 for the different forms of the message content 444 of the commercial message 410 to determine or switch to the appropriate form for the message content 444 with the message play time 446 is within the available play time 450. For example, the message organizer module 460 can search the message play time 446 for the intermediate content 426 and compare with the available play time 450.

If the message play time 446 for the intermediate content 426 is shorter than the available play time 450, then the message organizer module 460 select the intermediate content 426 for the commercial message 410. If the message play time 446 for the intermediate content 426 exceeds the available play time 450, the message organizer module 460 can compare the message play time 446 for the brief content 424 with the available play time 450. If the message play time 446 for the brief content 424 is within the available play time 450, the message organizer module 460 can select the brief content 424 of the commercial message 410.

In addition to adjusting or selecting or switching the form of the message content 444, the message organizer module 460 can adjust the message presentation speed 452 to shorten the message play time 446 to fit the available play time 450. Continuing with the example above, when there is not sufficient time to play the older instance of the commercial message 410, the message organizer module 460 can select the commercial message 410 at the fast speed 434 to be played by the message presentation module 480.

If the message play time 446 of the commercial message 410 at the fast speed 434 is within the available play time 450, the message organizer module 460 can select the commercial message 410 at the fast speed 434. If the message play time 446 at the fast speed 434 still exceeds the available play time 450, the message organizer module 460 can check the message play time 446 of the intermediate content 426 at the normal speed 432, the intermediate content 426 at the fast speed 434, or the brief content 424 at the normal speed 432.

The message organizer module 460 can select the appropriate message content 444 and the message presentation speed 452 of the commercial message 410 with the message play time 446 being shorter than the available play time 450. The message organizer module 460 is intelligent to search the appropriate combination of the form of the message content 444 and the message presentation speed 452 for the system message 224 to maximize the information that can be played out.

The message organizer module 460 monitors messages in the message queue 468. The message organizer module 460 can adjusts the priority value 442 and position for the system message 224 in the message queue 468 based on the available play time 450 and other conditions and restrictions.

Continuing with the above example, the commercial message 410 has been pushed to the back of the message queue 468 a few times to let the messages with higher priorities be played out first. The commercial message 410 is moved to the front of the message queue 468 with now the priority value 442 of "000". Before the commercial message 410 has chance to be dispatched from the message queue 468, the message organizer module 460 can generate the point of interest message 416.

Although the point of interest message 416 has a higher priority than the commercial message 410 based on the message type, the current location 220 is closer to the point A corresponding to the commercial message 410 than the point B corresponding to the point of interest message 416. The message organizer module 460 can determine that the commercial message 410 has a higher priority than the point of interest message 416 according to the conditions and restrictions. As such, the point of interest message 416 is inserted to the back of the message queue 468 with the priority value 442 of "001" while the commercial message 410 remains at the front of the message queue 468 with the priority value 442 of "000".

However, when the message presentation module 480 is ready to play the commercial message 410 at the front of the message queue 468, the available play time 450 has changed and shorter than the message play time 446 even with the brief content 424, but greater than the message play time 446 of the point of interest message 416. The message organizer module 460 can compare the message play time 446 of the messages and evaluates other conditions and restriction, determines that the point of interest message 416 has a higher priority than the commercial message 410. The point of interest message 416 is moved to the front of the message queue 468 with the priority value 442 of "000", the commercial message 410 is moved to the back of the message queue 468 with the priority value 442 of "001".

The available play time 450 is a dynamic number, which is calculated by the message organizer module 460, based on the current location 220, message type, the point of interest corresponding to the message, vehicle speed, and other restrictions and conditions. The messages towards the front of the message queue 468 can lose the chance to be played due to the change of the available play time 450 when the message presentation module 480 is ready to present the message.

The available play time 450 can be less than the message play time 446 when the message presentation module 480 is ready to play the system message 224, although the available play time 450 was greater than the message play time 446 when the system message 224 was inserted to the front of the message queue 468 with a priority value "000". Continuing with the above example, the commercial message 410 lost the chance to play and was moved to the back of the message queue 468 because of the change of the available play time 450 even though there was sufficient time to be played out when the commercial message 410 was inserted to the message queue 468 with a highest priority.

The message organizer module 460 can monitor the message queue 468 and eliminate the messages which do not have sufficient time to play. Continuing with the example above, the commercial message 410 does not have sufficient time to play and is pushed to the back of the message queue 468. The message organizer module 460 can eliminate the commercial message 410 from the message queue 468 because it will have no chance to be played out.

Another example, the system message 224 at front of the message queue 468 can be the navigation message 412, which is waiting to be dispatched when the message presentation module 480 is ready. Before the navigation message 412 is dispatched, the user of the navigation system 100 goes off the route. The navigation system 100 or the message generation module 440 can generate an updated instance of the navigation message 412 to bring the user back to the route or to a detour.

The message organizer module 460 can evaluate the updated instance of the navigation message 412 and the older instance of the navigation message 412 to determine that the updated instance of the navigation message 412 has a higher priority than the older instance of the navigation message 412. The updated instance of the navigation message 412 is inserted to the front of the message queue 468 with the priority value 442 of "000". The older instance of the navigation message 412 can be moved to the back of the message queue 468 with a priority value 442 of "001". The message organizer module 460 can determine that the older instance of the navigation message 412 will never be played since the user has taken a detour or is off the original route despite that the message play time 446 of the navigation message 412 is still within the available play time 450. The older instance of the navigation message 412 will be eliminated from message queue 468.

The message organizer module 460 can adjust the message priorities to maximize the amount of messages to be played out. For example, the message generation module 440 generates the reminder message 418 corresponding to an automatic teller machine (ATM) location and the point of interest message 416 corresponding to a gas station. Based on the message type, the message organizer module 460 can determine that the point of interest message 416 has a higher priority than the reminder message 418.

However, the current location 220 is closer to ATM than gas station. When the message organizer module 460 prioritizes messages based on the type of the message, the point of interest message 416 is to be played out first. After the point of interest message 416 is played, the reminder message 418 has to be skipped because the available play time 450 is insufficient.

The message organizer module 460 is intelligent to evaluate the current conditions and restrictions to determine the priority of the messages in order to play the maximum amount of information to user. In the examples above, the message organizer module 460 can determine to prioritize the reminder message 418 first while the point of interest message 416 still has sufficient time to play after the reminder message 418. The message organizer module 460 can move the reminder message 418 to the front of the message queue 468 with a higher priority and the point of interest message 416 to the back of the message queue 468 with a lower priority. The message organizer module 460 can consider the conditions and restrictions including the message type, the message play time 446, the current location 220, and the available play time 450, the vehicle speed, the form for the message content 444 and the message presentation speed 452, to decide the priorities of the messages. The navigation system 100 is capable of playing the maximum amount of information to the user.

When the user preferences is changed, the message organizer module 460 can to re-evaluate the messages in the message queue 468, re-assign the priority value 442, and re-arrange the message positions in the message queue 468 to meet updated preferences. The user preferences can include the message format preference 422 and the presentation speed preference 430.

For example, the message organizer module 460 can insert the point of interest message 416 with the brief content 424 to the front of the message queue 468. The message play time 446 for the point of interest message 416 with the brief content 424 is shorter than the available play time 450. The message presentation module 480 is ready to play the point of interest message 416 with the brief content 424.

Before the point of interest message 416 is dispatched, the form for the message content 444 is changed from the brief content 424 to the intermediate content 426. The message organizer module 460 can update the messages in the message queue 468 with the intermediate content 426 and adjust the message priorities. The point of interest message 416 in the message queue 468 can be updated with the intermediate content 426.

The message organizer module 460 can re-evaluate the messages by re-calculating the message play time 446 and comparing with the available play time 450. The point of interest message 416 can be removed from the front of the message queue 468 when the message organizer module 460 determines that the message play time 446 of the intermediate content 426 exceeds the available play time 450. The point of interest message 416 can be removed from the message queue 468 and will not be played.

The message presentation module 480 can receive the system message 224 in different formats, for example, text format or audio format. The message presentation module 480 can include a text to speech (TTS) engine 482. The TTS engine 482 converts a text message 484 to an audio message 486. The message presentation module 480 can play the audio message 486 at the message presentation speed 452.

The message presentation module 480 can convert the system message 224, which is dispatched from the message organizer module 460, from the text message 484 into the audio message 486. The audio message 486 can be played at the normal speed 432 or the fast speed 434 according to the presentation speed preference 430. The message presentation module 480 can play the audio message 486 through audio system, which can be speaker, headphone, blue tooth or other audio devices. After the audio message 486 has been played, the message presentation module 480 can acknowledge the message organizer module 460 to dispatch next message.

For example, the navigation message 412 occupies at the front of the message queue 468, and the commercial message 410 occupies at the back of the message queue 468. The navigation message 412 is dispatched from the message queue 468 from the message organizer module 460 to the message presentation module 480. The message presentation module 480 can convert the text message 484 of the navigation message 412 to the audio message 486. The audio message 486 of the navigation message 412 will be played. Before the audio message 486 of the navigation message 412 is completely played, the commercial message 410, which is moved to the front of the message queue 468, needs to wait until the message presentation module 480 is available and acknowledge the message organizer module 460 to dispatch next message.

The modules described in this application can be part of the first software 326 of FIG. 3 the second software 342 of FIG. 3, or a combination thereof. These modules can also be stored in the first storage unit 314 of FIG. 3, the second storage unit 346 of FIG. 3, or a combination thereof. The first control unit 312, the second control unit 334, or a combination thereof can execute these modules for operating the navigation system 100.

The navigation system 100 has been described with module functions or order as an example. The navigation system 100 can partition the modules differently or order the modules differently. For example, the message generation module 440, the message organizer module 460, and the message presentation module 480 can be configured to have functions shared or loop back to one another.

The modules described in this application can be hardware implementation, hardware accelerators, or hardware circuitry in the first control unit 312 of FIG. 3 or in the second control unit 334 of FIG. 3. The modules can also be hardware implementation, hardware accelerators, or hardware circuitry within the first device 102 or the second device 106 but outside of the first control unit 312 or the second control unit 334, respectively.

Figure 5:
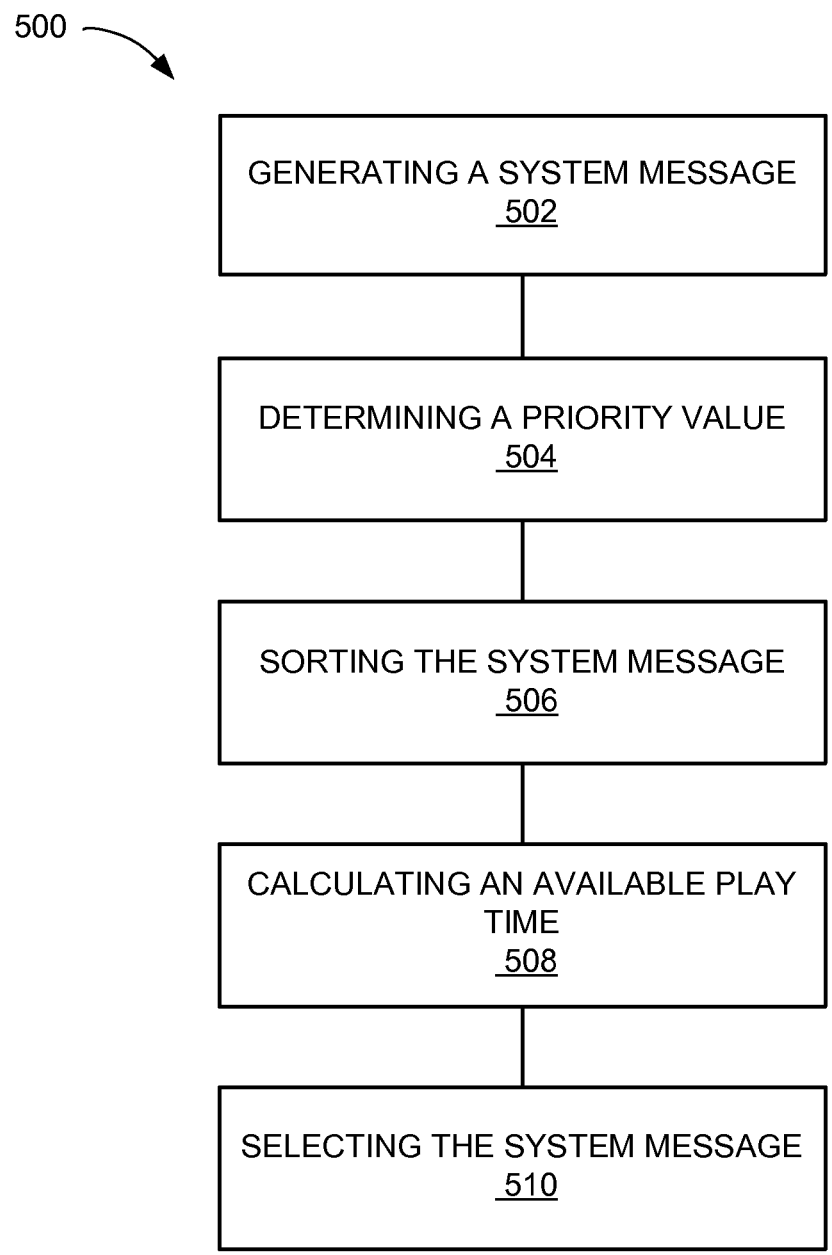
FIG. 5 is a flow chart of a method of operation of a navigation system in an embodiment of the present invention.

Referring now to FIG. 5, therein is shown a flow chart of a method 500 of operation of a navigation system 100 in an embodiment of the present invention. The method 500 includes: generating a system message along a route in a block 502; determining a priority value for the system message in a block 504; sorting the system message based on the priority value and a message play time for the system message in a block 506; calculating an available play time for the system message in a block 508; and selecting the system message having the message play time not exceeding the available play time in a block 510.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a navigation system comprising:
   generating a system message including a message play time associated with playing the system message at a normal rate along a route;
   determining a priority value for the system message;
   sorting the system message based on the priority value and the message play time for the system message;
   calculating an available play time for the system message based on the route;
   selecting the system message including the message play time not exceeding the available play time based on adjusting a message presentation speed to a fast speed for playing the system message to fit within the available play time with a control unit.

2. The method as claimed in claim 1 wherein generating the system message includes generating the system message based on a message type setting and the message presentation speed.

3. The method as claimed in claim 1 wherein selecting the system message having the message play time not exceeding the available play time includes selecting a detailed content, an intermediate content, or a brief content for the system message based on the available play time.

4. The method as claimed in claim 1 further comprising selecting a message content and the message presentation speed based on the available play time.

5. The method as claimed in claim 1 wherein calculating the available play time includes calculating the available play time based on a current location.

6. The method as claimed in claim 1 wherein selecting the system message having the message play time not exceeding the available play time includes:
   selecting a message content as a detailed content; and
   switching the message content to an intermediate content or a brief content based on a change to the available play time.

7. The method as claimed in claim 1 wherein:
   generating the system message includes:
      generating a first message,
      generating a second message after the first message;
   sorting the system message includes inserting the first message and the second message into a message queue based on a current location; and
   selecting the system message includes selecting the system message from the message queue.

8. The method as claimed in claim 1 wherein:
   generating the system message includes:
      generating a first message having a first message play time,
      generating a second message after the first message, the second message having a second message play time;
   sorting the system message based on the priority value and the message play time includes:
      inserting the first message at a head of a message queue before the generation of the second message,
      inserting the second message into the message queue and behind the first message; and
   selecting the system message having the message play time not exceeding the available play time includes selecting the second message from the message queue when the first message play time exceeds the available play time.

9. The method as claimed in claim 1 wherein:
   generating the system message includes:
      generating a first message having a first message play time,
      generating a second message having a second message play time;
   determining the priority value for the system message includes:
      determining a first priority value for the first message,
      determine a second priority value for the second message, the second priority value is same as the first priority value;
   sorting the system message based on the priority value and the message play time includes:
      inserting the first message at a head of a message queue before the generation of the second message,
      inserting the second message at the head of the message queue and moving the first message from the head of the message queue based on the second message play time greater than the first message play time; and
   selecting the system message having the message play time not exceeding the available play time includes selecting from the head of the message queue.

10. The method as claimed in claim 1 wherein:
   generating the system message includes:
      generating a first message,
      generating a second message after the first message;
   determining the priority value for the system message includes:
      determining a first priority value for the first message,
      determine a second priority value for the second message, the second priority value is a higher priority than the first priority value;
   sorting the system message based on the priority value and the message play time includes:
      inserting the first message at a head of a message queue before the generation of the second message,
      inserting the second message at the head of the message queue and moving the first message from the head of the message queue;
   calculating the available play time for the system message includes:
      calculating a first available play time for the first message,
      calculating a second available play time for the second message; and
   selecting the system message having the message play time not exceeding the available play time includes selecting the first message when the second message play time exceeds the second available play time.

11. A navigation system comprising:
   a control unit configured to:
      generate a system message including the message play time associated with playing the system message at a normal rate along a route,
      determine a priority value for the system message;
      sort the system message based on the priority value and the message play time for the system message,
      calculate an available play time for the system message based on the route,
      select the system message including the message play time not exceeding the available play time based on adjusting the message presentation speed to a fast speed for playing the system message to fit within the available play time; and
   a storage unit, coupled to the control unit, configured to store the system message.

12. The system as claimed in claim 11 wherein the control unit is configured to generate the system message based on a message type setting and the message presentation speed.

13. The system as claimed in claim 11 wherein the control unit is configured to select a detailed content, an intermediate content, or a brief content for the system message based on the available play time.

14. The system as claimed in claim 11 wherein the control unit is configured to select a message content and the message presentation speed based on the available play time.

15. The system as claimed in claim 11 wherein the control unit is configured to calculate the available play time based on a current location.

16. The system as claimed in claim 11 wherein the control unit is configured to select the system message including:
   selecting a message content as a detailed content; and
   switching the message content to an intermediate content or a brief content based on a change to the available play time.

17. The system as claimed in claim 11 wherein the control unit is configured to:
  generate the system message including:
    generating a first message,
    generating a second message after the first message;
  sort the system message includes inserting the first message and the second message into a message queue based on a current location; and
  select the system message from the message queue.

18. The system as claimed in claim 11 wherein the control unit is configured to:
  generate the system message including:
    generating a first message having a first message play time,
    generating a second message after the first message, the second message having a second message play time;
  sort the system message based on the priority value and the message play time for the system message including:
    insert the first message at a head of a message queue before the generation of the second message,
    insert the second message into the message queue and behind the first message; and
  select the system message includes selecting the second message from the message queue when the first message play time exceeds the available play time.

19. The system as claimed in claim 11 wherein the control unit is configured to:
  generate the system message including:
    generating a first message having a first message play time,
    generating a second message having a second message play time;
  determine the priority value for the system message, including:
    determining a first priority value for the first message,
    determine a second priority value for the second message, the second priority value is same as the first priority value;
  sort the system message based on the priority value and the message play time for the system message including:
    inserting the first message at a head of a message queue before the generation of the second message,
    inserting the second message at the head of the message queue and moving the first message from the head of the message queue based on the second message play time greater than the first message play time;
  calculate the available play time for the system message including:
    calculating a first available play time for the first message,
    calculating a second available play time for the second message; and
  select the system message includes selecting from the head of the message queue.

20. The system as claimed in claim 11 wherein the control unit is configured to:
  generate the system message including:
    generating a first message,
    generating a second message after the first message;
  determine the priority value for the system message including:
    determining a first priority value for the first message,
    determine a second priority value for the second message, the second priority value is a higher priority than the first priority value;
  sort the system message based on the priority value and the message play time for the system message including:
    inserting the first message at a head of a message queue before the generation of the second message,
    inserting the second message at the head of the message queue and moving the first message from the head of the message queue;
  calculate the available play time for the system message including:
    calculating a first available play time for the first message,
    calculating a second available play time for the second message; and
  select the system message having the message play time not exceeding the available play time includes selecting the first message when the second message play time exceeds the second available play time.

* * * * *